United States Patent [19]

Trechsel

[11] Patent Number: 5,117,700
[45] Date of Patent: Jun. 2, 1992

[54] MINIATURE LINEAR ACTUATOR

[75] Inventor: Hans W. Trechsel, Rockford, Minn.

[73] Assignee: Ross-Hime Designs, Incorporated, Minneapolis, Minn.

[21] Appl. No.: 660,148

[22] Filed: Feb. 25, 1991

[51] Int. Cl.⁵ .................. F16H 25/24; F16H 27/02
[52] U.S. Cl. ..................... 74/89.15; 74/424.8 R; 74/441
[58] Field of Search .............. 74/424.8 R, 89.15, 441

[56] References Cited

U.S. PATENT DOCUMENTS

| | | | |
|---|---|---|---|
| 2,567,483 | 9/1951 | Hotine | 74/441 |
| 3,751,998 | 8/1973 | Vasilatos | 74/89.15 |
| 3,861,226 | 1/1975 | Stanley | 74/89.15 |
| 4,050,319 | 9/1977 | Stanley | 74/89.15 |
| 4,337,671 | 7/1982 | Ulf | 74/89.15 X |
| 4,392,390 | 7/1983 | Johnson | 74/89.15 |
| 4,409,888 | 10/1983 | Weyer | 92/31 |
| 4,591,313 | 5/1986 | Miyatake et al. | 416/155 |
| 4,679,451 | 7/1987 | Nakamura | 74/606 R |
| 4,867,000 | 9/1989 | Lentz | 74/89.15 |
| 4,872,903 | 10/1989 | Periou | 74/89.15 |
| 4,889,002 | 12/1989 | Abraham | 74/89.15 |

Primary Examiner—Allan D. Herrmann
Assistant Examiner—David W. Laub
Attorney, Agent, or Firm—Kinney & Lange

[57] ABSTRACT

An actuating device having increased stiffness through the use of an extendable sleeve that is capable of extending and retracting from the drive device. The drive device is capable of fitting within the extendable sleeve.

10 Claims, 6 Drawing Sheets

MINIATURE LINEAR ACTUATOR

BACKGROUND OF THE INVENTION

The present invention relates to linear actuators and, more particularly, to miniature linear actuators.

Linear actuators are well known and widely used to convert torque produced by an electric motor or the like into linear motion. The requirements of certain kinds of uses demand that the linear actuator be miniature in size. Situations requiring miniature linear actuators include space-borne applications where size and weight is crucial, robotics applications and various assembly and instrumentation applications. For these types of applications, a miniature actuator is desired that has high stiffness to resist bending under heavy loads.

In addition, the miniature actuator should be fast acting thereby producing motion without delay and a capability of moving rapidly through its limits of motion. Finally, the miniature actuator should be well suited for commercially available components to be used therewith such as miniature electric motors which are high rotation rate and low torque devices, and gearboxes that have fixed reduction ratios.

Commonly used linear actuators make use of a motor driven screw having a nut thereon. The nut has a sleeve assembly attached thereto. The sleeve extends from a housing which prevents the sleeve from rotating with the nut while allowing the sleeve to be extended from and returned toward the housing. Rotation of the screw produces forces on the nut acting parallel to the longitudinal axis of the screw to force the nut to move linearly along the screw and thereby extend or retract the sleeve.

An example of this type of linear actuator is found in U.S. Pat. No. 4,392,390 to Johnson. While this mechanism employs one method of converting torque to linear motion, it also serves to identify several drawbacks the screw and nut system has when used for miniature applications. Bending forces resulting from load forces acting on the extended sleeve must be borne by the screw shaft. The stiffness of the screw shaft decreases with a decrease in diameter of the shaft. Therefore, such miniaturized screw and nut type linear actuators have reduced stiffness, i.e. resistance to bending. In addition, a miniaturized screw and nut type actuator requires the use of small shaft bearings that are not capable of withstanding either high bending forces acting in the direction perpendicular to the shaft axis or forces acting along the screw axis.

SUMMARY OF THE INVENTION

The present invention is an actuating device suited for separating bodies relative to one another. The device has a drive assembly which includes a rotary motion transmission means that has first and second ends. The first end is suited for connecting to a source of torque and the second end is suited for imparting a corresponding torque. In addition, the drive assembly has a mounting that is suited for supporting the rotary motion transmission. The rotary motion is connected to an interior truncated forcing means so as to be able to provide torque thereto. The interior truncated forcing means has a first spiral forcing thread forming at least part of an outer surface thereof. Also included in the device is an exterior extension that has a first extension thread forming at least part of an inner surface thereof. The exterior extension has an aperture exposing the inner surface through which both the interior forcing means and the drive assembly can be positioned at least in part within the exterior extension. The first forcing thread is in threaded engagement with the first extension thread such that rotation of the interior truncated forcing means results in the first forcing thread being forced to move along the first extension thread. This forces the exterior extension to move relative to the drive assembly, and with a range of motion such that the first spiral forcing thread is positionable at least in part about the drive assembly.

In one preferred embodiment of the present invention the interior truncated forcing means has a plurality of spiral forcing threads forming at least part of an outer surface thereof.

In another preferred embodiment of the present invention the interior truncated forcing means includes a first outer portion having a part of the first spiral forcing thread formed in its outer surface, a second outer portion having another part of the first spiral forcing thread formed in its outer surface, and locking means for fixing the position of the first outer portion relative to the second outer portion.

In yet another preferred embodiment, the interior truncated forcing means includes: a base means against a portion of the drive assembly other than the rotary motion transmission. An outer sleeve has an outer surface in which the first spiral forcing thread is formed, the outer sleeve being capable of rotating on the base means. Forces acting on the exterior extension means are transferred to the base means of the interior truncated forcing means, and those forces are in turn transferred to the drive assembly.

DETAILED DESCRIPTION OF THE PREFERRED EMBODIMENTS

The actuating device of this invention is shown in FIGS. 1 through 8 and referenced generally by the numeral 10.

Figure 1:
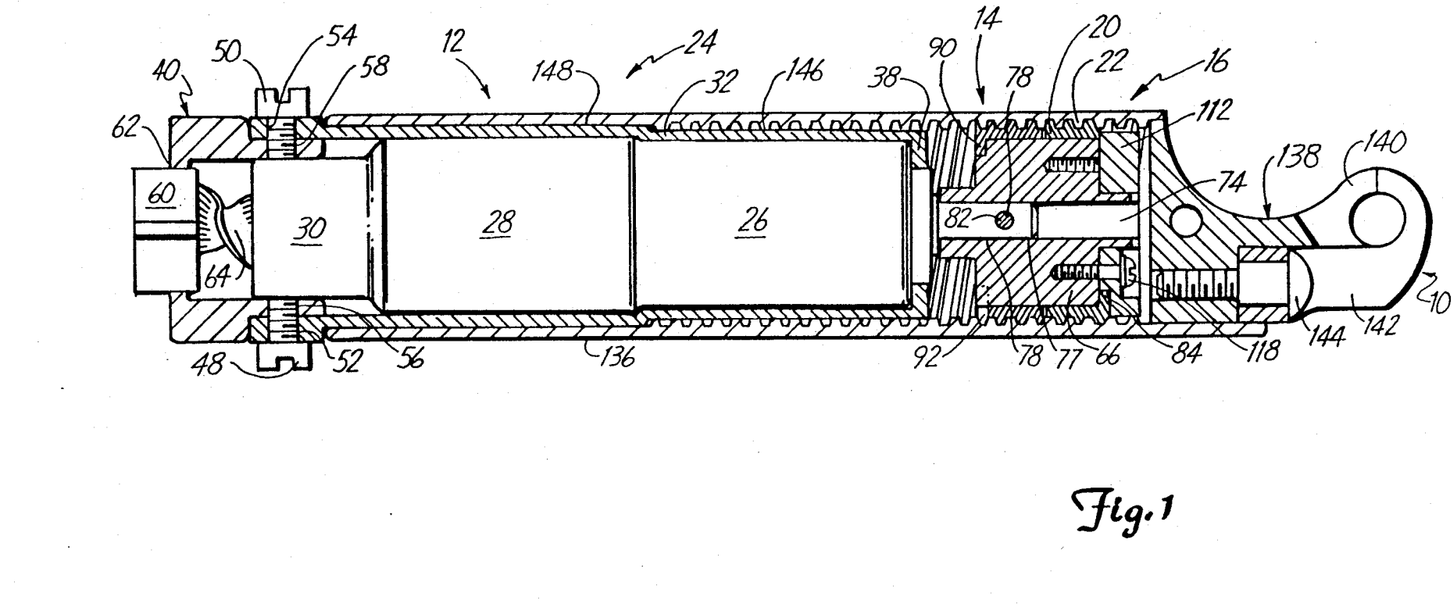
FIG. 1 is a longitudinal section view of the linear actuator of the present invention.

Referring to FIG. 1, the actuating device 10 has a drive assembly, 12, and an interior truncating forcing device or drive screw, 14, situated at least partially within an exterior extension or threaded shell, 16. Drive assembly 12 is linked to drive screw 14 by a drive shaft, 18. Drive screw 14 is in turn linked to threaded shell 16 by a spiral forcing thread, 20, forming the surface of drive screw 14 in engagement with an extension thread, 22, forming the inner surface of threaded shell 16.

Figures 2, 3:
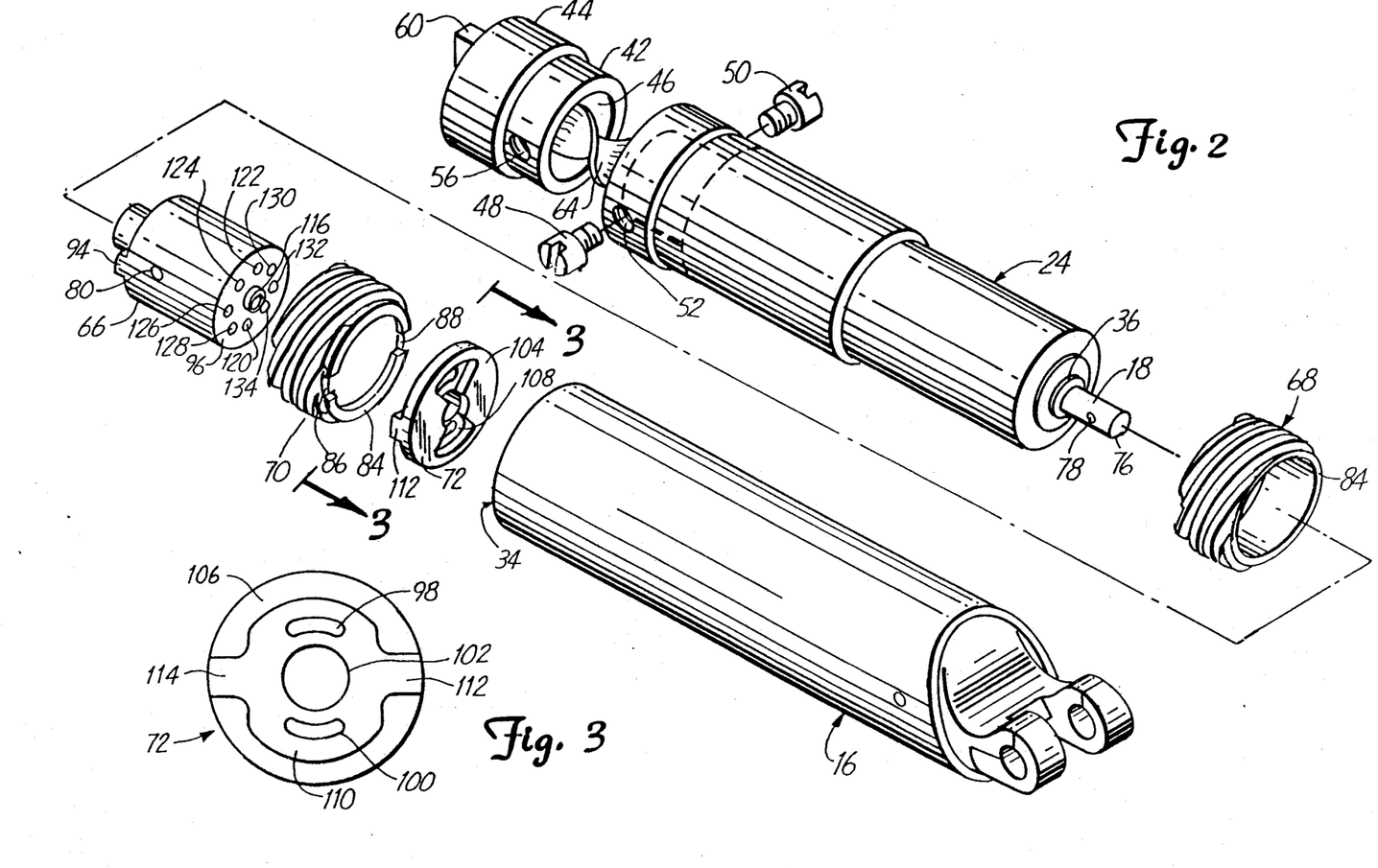
FIG. 2 is an exploded perspective view of the linear actuator of FIG. 1.
FIG. 3 is an elevational view taken along line 3—3 of FIG. 2.

Drive assembly 12, as best seen in FIGS. 1 and 2, includes a motor/gearbox/encoder assembly, 24, including a gearbox assembly, 26, that may be a planetary gear assembly or a straight gear assembly. These types of gearboxes are well known and commonly used in the art. A motor, 28, is connected (not shown) suitably for providing torque to gearbox assembly 26. Motor 28 is a direct current brush type or cup type motor. However, a brushless type motor may be used. Motor 28 has a rotation rate in the range of 6,000 to 12,000 revolutions per minute (rpm) and produces relatively low torque. Gearbox assembly 26 converts the high rpm low torque output of motor 28 to a high torque lower revolution rate output at drive shaft 18.

A feedback encoder, 30, has a suitable linkage to motor 28 for producing motor speed and shaft position information for use by an actuator controller (not shown). Feedback encoder 30 may be optical or mechanical devices and are well known in the art.

A stepped cylindrical drive housing encases the motor/gearbox/encoder assembly 24. Motor/gearbox/encoder assembly 24 is slip-fit with a drive housing, 32, to prevent bending or distortion of the drive housing 32. A large opening, 34, is provided at the inner end of drive housing 32 for receiving the motor/gearbox/encoder assembly 24. A smaller opening, 36, at the outer end of drive housing 32 is provided for allowing drive shaft 18 to extend therethrough with a flange, 38, which prevents motor/gearbox/encoder assembly 24 from passing through smaller opening 36.

A hollow stepped cylindrical end cap, 40, has a first outer circumference, 42, and a second larger outer circumference, 44. The inside diameter, 46, of end cap 40 is sufficiently large so as to allow the open end of end cap 40 to fit over encoder 30. Additionally, the first outer circumference 42 is small enough to fit within the large opening 34 of drive housing 32. End cap 40 thereby serves to not only enclose drive housing 32, but also to secure encoder 30 within drive housing 32. End cap 40 is held in place by a pair of opposing screws disposed on either side of drive housing 32 and extending through corresponding threaded openings, 52 and 54, in drive housing 32, and 56 and 58, in end cap 40. Screws 48 and 50, in addition to providing a means for securing end cap 40 within drive housing 32, also provide a trunnion or double pivot for device 10 when used in conjunction with an external mounting means (not shown).

A multi-pin connector, 60, is mounted in a slot on the end wall, 62, of end cap 40. Multi-pin connector 60 is connected to a multi-conductor cable, 64, that extends from the motor/gearbox/encoder assembly 24. Multi-pin connector 60 is suitable for mating with a complementary connector (not shown) that is electrically connected to an actuating device controller (not shown). Typical of electrical signals that may be exchanged between the actuating device 10 and an outside controller may include a positive supply voltage, a negative supply voltage, a motor shaft velocity signal and a motor shaft position signal. These signals may be analog signals or digitally encoded signals. Such techniques are well known in the art.

As can be seen in FIGS. 1, 2, 3 and 4, the drive screw 14 includes a hub portion, 66, and an trailing screw, 68, an lead screw, 70, and a screw phaser, 72. Hub 66 has an axial bore, 74, that is complementary to a flattened portion, 76, of drive shaft 18. The engagement of the flattened portion 76 on drive shaft 18 with a flattened portion, 77, on hub 66 acts to fix rotationally hub 66 with drive shaft 18. A first axial locking bore, 78, extends through drive shaft 18 with a corresponding second axial locking bore, 80, extending radially through hub 66. Both the first axial locking bore 78 and the second axial locking bore 80 are in alignment axially when hub 66 is positioned properly on drive shaft 18. An axial locking pin, 82, is a solid stainless steel cylindrical pin that is positioned through the first axial locking bore 78 in drive shaft 18 while extending into the second axial locking bore 80 in hub 66 thereby preventing axial movement of hub 66 on drive shaft 18.

Lead screw 70 has a truncated tubular shape that has a trailing end flange, 84, at its outer edge. A first key slot, 86, and a second key slot, 88, are cut out from trailing end retaining flange 84 so that each key slot is 180° apart from each other. Similarly, trailing screw 68 has a trailing end retaining flange having a first trailing end key slot, 92, and a second trailing end key slot (not shown) separated 180° apart from each other. Hub 66 correspondingly has a rectangular shaped hub first hub key, 94, extending axially therefrom. A second hub key (not shown), that is also rectangularly shaped and extending axially from hub 66, is separated 180° from first hub key 94. Trailing screw 68 is positioned concentrically over hub 66 such that first hub key 94 and the second hub key (not shown), extend through first trailing end key slot 92 and the second trailing end slot, respectively, thereby insuring that trailing screw 68 rotates with hub 66. Lead screw 70 is placed concentrically over hub 66 such that trailing end retaining flange 84 is in contact with the outer face, 96, of hub 66.

As seen in FIG. 3, screw phaser 72 has a disk shape with a first radially curved slot, 98, and a second radially curved slot, 100, on either side of a central opening, 102. Screw phaser 72 has an outer face, 104, and an inner face, 106. The outer face 106 has a counter sunk area, 108, that surround the radially curved slots 98 and 99. A raised portion, 110, on the inner face 106 of screw phaser 72 forms a first screw phaser key, 112, and a second screw phaser key, 114. Screw phaser 72 is positioned with raised portion 110 supported by a cylindrically shaped hub extension, 116, such that the hub extension extends through central opening 102 of screw phaser 72. Screw phaser 72 is aligned with lead screw 70 such that first screw phaser key 112 and second screw phaser key 114 are inserted into first key slot 86 and second key slot 88, respectively, of lead screw 70 thereby locking the rotation of lead screw 70 with screw phaser 72. A first screw phaser locking screw, 118, and a second screw phaser locking screw (not shown) pass through second radially curved slot 100 and first radially curved slot 98, respectively, and into a first threaded bore, 120, and a second threaded bore, 122, respectively. Screw phaser 72 may be rotated on hub extension 116 and locked into place with first screw phaser locking screw 118 and the second screw phase locking screw with any one of the other threaded bores, 124, 126, 128, 130, 132, and 134, that first radially curved slot 98 and second radially curved slot 100 allow.

Figure 4:
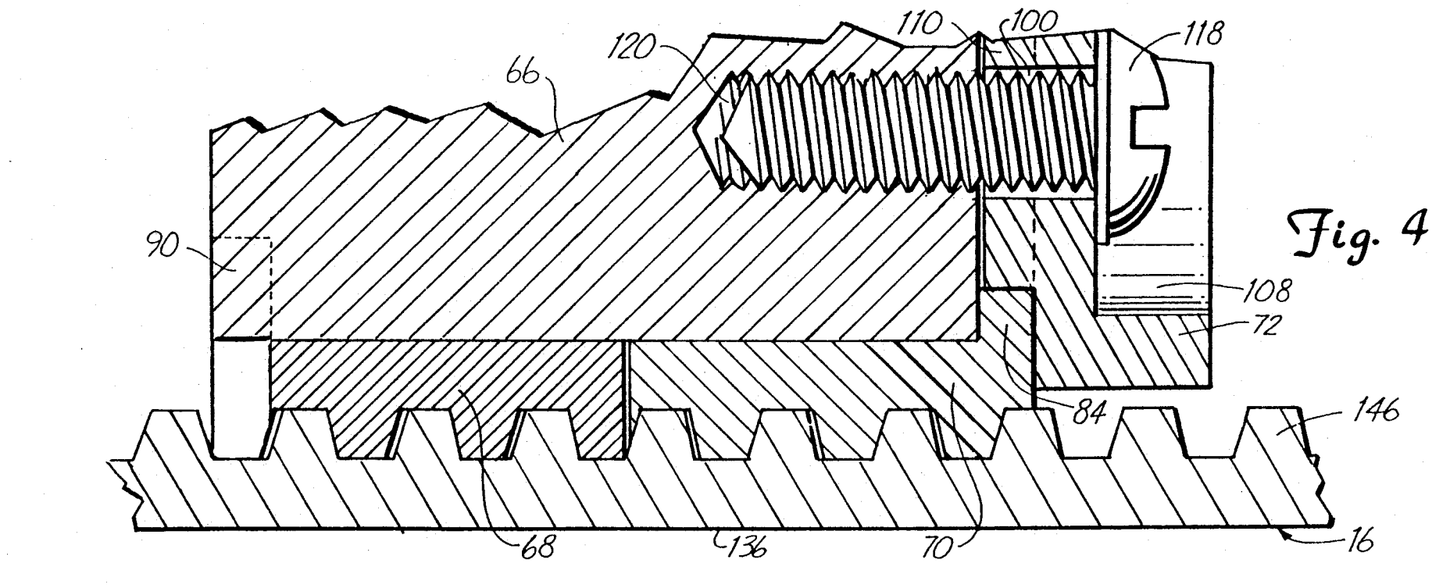
FIG. 4 is a sectional view of the drive screw with parts broken away and shown greatly enlarged for clarity.

As probably best seen in FIGS. 1, 2 and 4, threaded shell 16 includes a hollow tubular portion, 136, and a pivot yoke portion, 138. Pivot yoke 138 is pinned (not shown) to the outer end of threaded shell 16 so that it can easily be removed. Pivot yoke 138 includes an inner portion, 140, and an outer portion, 142, that are fastened securely together with a fastening screw, 144. A first extension thread, 146, forms a portion of the inner surface thereof from approximately the center point of the hollow tubular portion 136 to the pivot yoke 138. The portion of threaded shell 16 from the first extension thread 146 to the end opposite pivot yoke 138 is a smooth inner surface, 148.

An alternative embodiment, designated 10', of the actuating device of the present invention is shown generally in FIGS. 5 through 8. Because of the similarities between alternative embodiment 10' and the embodiment described above, the portions that are similar will not be described in as much detail as they were in the previous embodiment.

Actuating device 10' of the present invention includes a drive assembly, 12', an interior truncated forcing device or drive screw, 14', and an exterior extension or threaded shell 16'. Drive assembly 12' has an inner end and an outer end, with the drive screw attached on the outer end by a drive shaft, 18'. Threaded shell 16' is attached to drive screw 14' by the engagement of a spiral forcing thread, 20', on drive screw 14' with an extension thread 22' on threaded shell Drive assembly 12' includes a gearbox assembly, 26', a motor, 28', and an encoder, 30'. The motor/gearbox/encoder assembly, 24', is encased in a drive housing, 32'. The motor/gearbox/encoder assembly 24' is restricted from axial movement by a flange, 38', on the outer end and on the inner end by an end cap, 40', and screws, 48' and 50'. A multi-conductor cable, 64', provides an electrical path from the motor/gearbox/encoder assembly 24' to a multi-pin connector, 60', mounted on end cap 40'.

Figure 7:
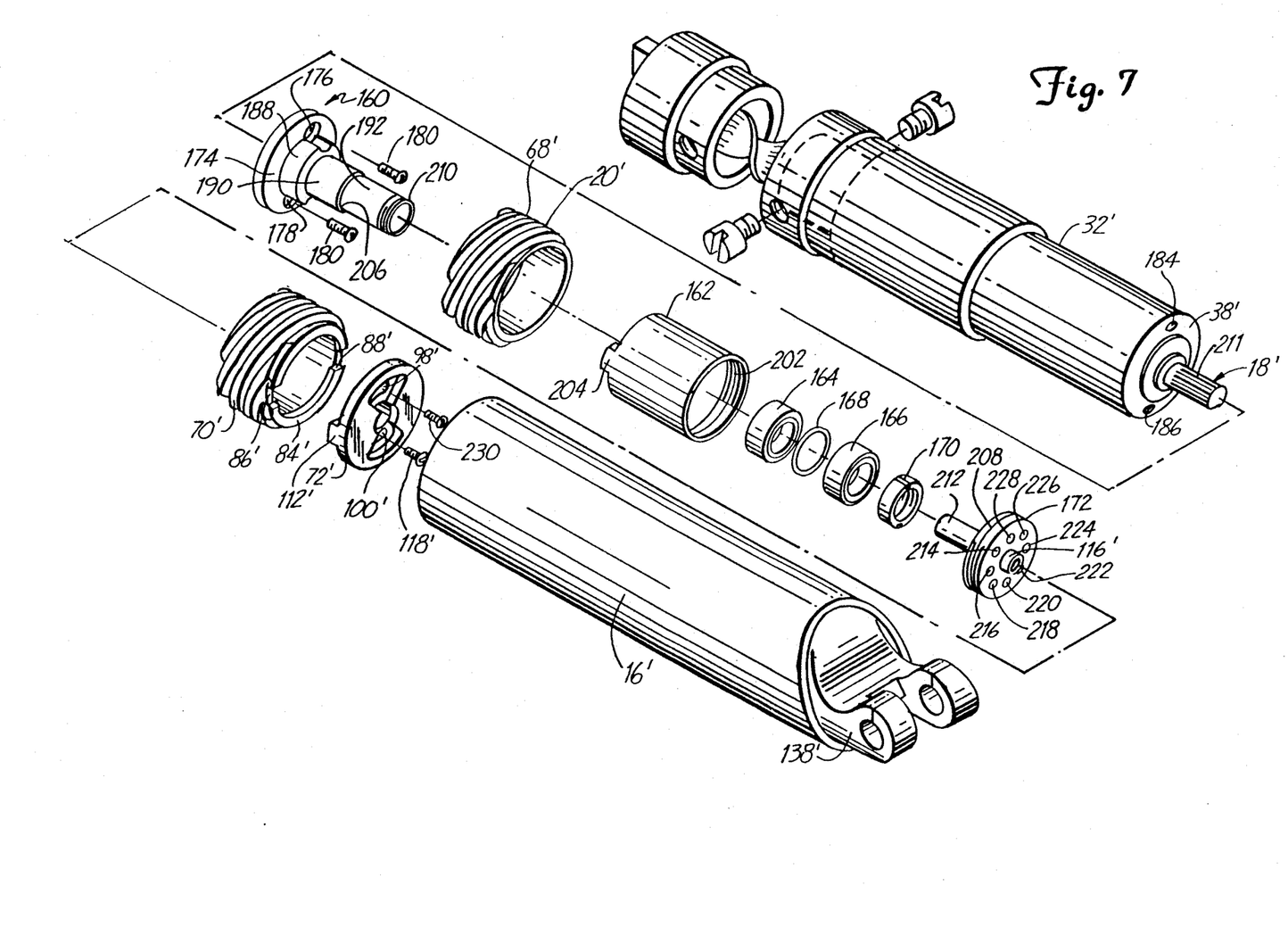
FIG. 7 is an exploded perspective view of the actuator shown in FIG. 5.
Figure 8:
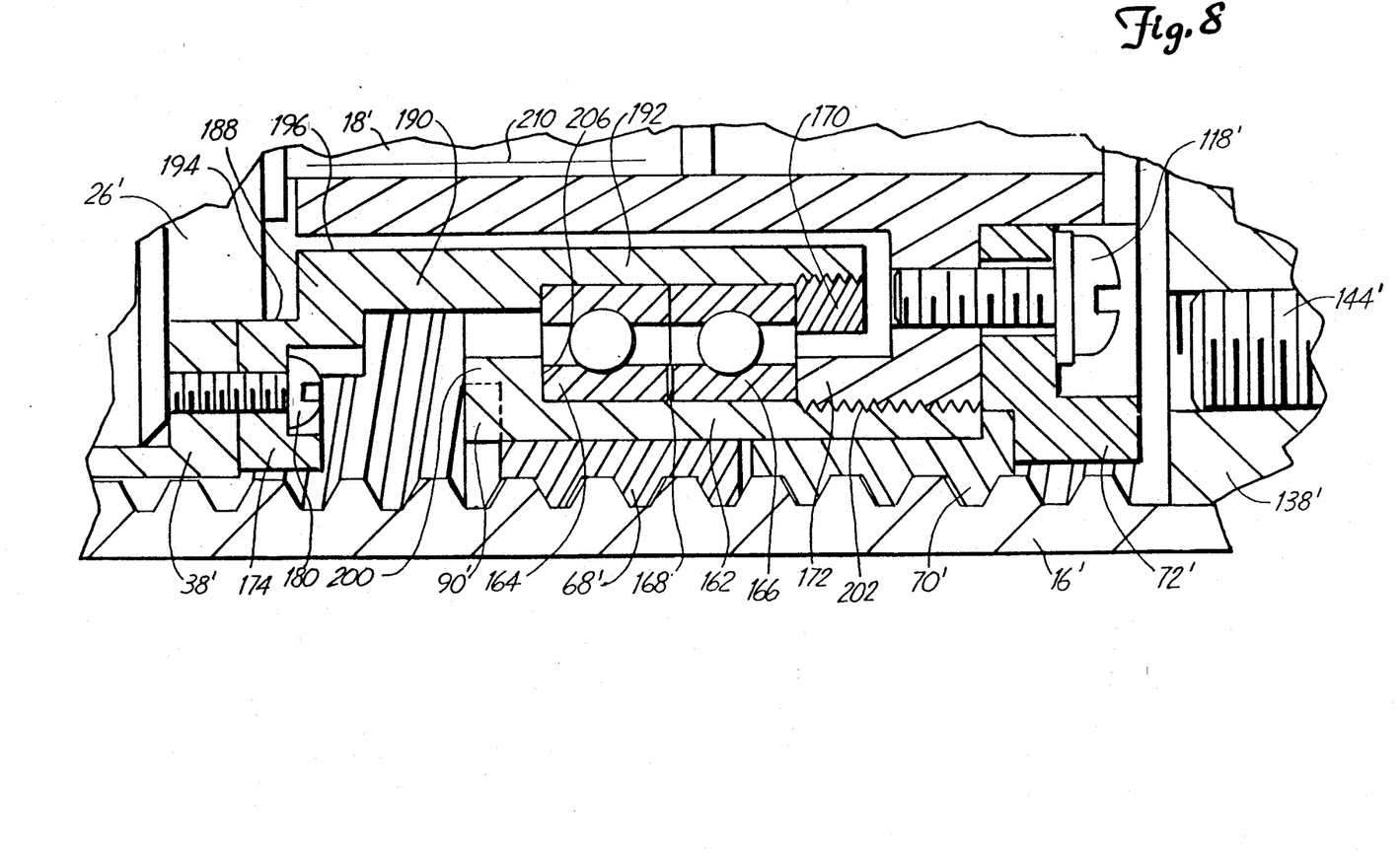
FIG. 8 is a longitudinal section view of the drive screw of FIG. 5 shown with parts broken away and greatly enlarged for clarity.

Drive screw 14' includes trailing screw, 68', lead screw, 70'. screw phaser, 72', motor mount 160, bearing housing, 162, inner bearing. 164, outer bearing, 166, bearing shim, 168, spanner nut. 170, and screw rotator, 172. As seen in FIG. 7, motor mount 160 has a mounting flange. 174, and a first motor mount mounting bore, 176, and second motor mount mounting bore, 178, centered on the diameter of mounting flange 174. Motor mount 160 is attached to flange 38' on drive housing 32' with a first motor mount bolt, 180, and a second motor mount bolt, 182, which extend through the first motor mount mounting bore 176 and second motor mount mounting bore 178, respectively, so as to engage a corresponding thread (not shown) in a first drive housing bore, 184, and a second drive housing bore, 186, respectively. Rotor mount 160 has a stepped cylindrical shape with a large cylinder portion, 188, attached to mounting flange 174, a middle-size cylinder, 190, attached to the large cylinder 188, and a small cylinder, 192, attached to the middle cylinder 190. Motor mount 160 has a larger inner diameter, 194, at the end towards the motor mount flange 174, and a smaller inner diameter, 196, toward the end opposite mounting flange 174. The larger inner diameter portion 194 of motor mount 160 is sufficiently large to accommodate an end portion, 198, of gear box 26' and the smaller inner diameter 196 is larger than the diameter of shaft 18'. Shaft 18' extends into the smaller cylinder portion 192 of motor mount 160 when positioned properly on flange 38'.

The bearing housing 162 has a hollow cylindrically shaped portion having a bearing housing flange, 200, at its inner end and a threaded portion at the outer end. A first rectangular key portion, 204, extends therefrom having a second rectangular key portion (not shown) separated from the first key portion 204 by 180°. Trailing screw 68' has a trailing end retaining flange, 90', and a spiral forcing thread 20' forming the outer surface thereof. Trailing screw 68' is positioned circumferentially over bearing housing 162 such that a first rectangular key portion 204 and a second rectangular key portion engage a corresponding first rectangular slot and second rectangular slot (not shown) in the trailing end retaining flange 90'. The engagement of keys 204 on the bearing housing 162 with the key slots 92' on trailing screw 68' insures that trailing screw 68' rotates with bearing housing 162. Bearing housing 162 is positioned over the small cylinder 192 and the middle cylinder 190 of motor mount 174. The bearing housing is supported by inner bearing 164 and outer bearing 166. Inner bearing 164 and outer bearing 166 are in turn supported by the smaller shaft portion 192 of motor mount 174. Inner bearing 164 and outer bearing 166 are held in place axially by an outer face, 206, of middle cylinder 190, a flange, 200, of bearing housing 162, spanner nut 170 and screw rotator 172. Shim 168 is positioned between inner bearing 164 and outer bearing 166 for applying a preload force to the bearings. The preload force is generated by first applying a force on inner bearing 164 and outer bearing 166 by rotating screw rotator 172 with threaded portion 208 in engagement with threaded portion 202 of bearing housing 162 such that the appropriate force is generated. Spanner nut 170 is threaded on a thread, 210, on the smallest cylinder 192 of mounting flange 174 to achieve the desired preload forces on inner bearing 164 and outer bearing 166. After the correct preload forces are set, screw phaser 172 is welded into position on bearing housing 162 to prevent any relative movement between the two Splines, 211, on drive shaft 18' engage the corresponding grooves (not shown) of the cylindrical portion of screw rotator 172. The engagement of the spline and groove rotationally locks screw phaser 172 to drive shaft 18'.

Lead screw 70' has a flanged portion, 84', and a first key slot, 86', and a second key slot, 88'. Lead screw 70' is placed circumferentially over bearing housing 162. Screw phaser 72' having a first screw phaser key, 112', and a second screw phaser key (not shown) is positioned over a hub extension, 116', such that the rectangular keys engage the rectangular key slots 86' and 88' of lead screw 70'. Eight threaded bores located on screw rotator 172 and radially curved slots, 98' and 100', allow screw phaser 72' to be positioned at any angular displacement relative to trailing screw 68' as desired.

Figure 5:
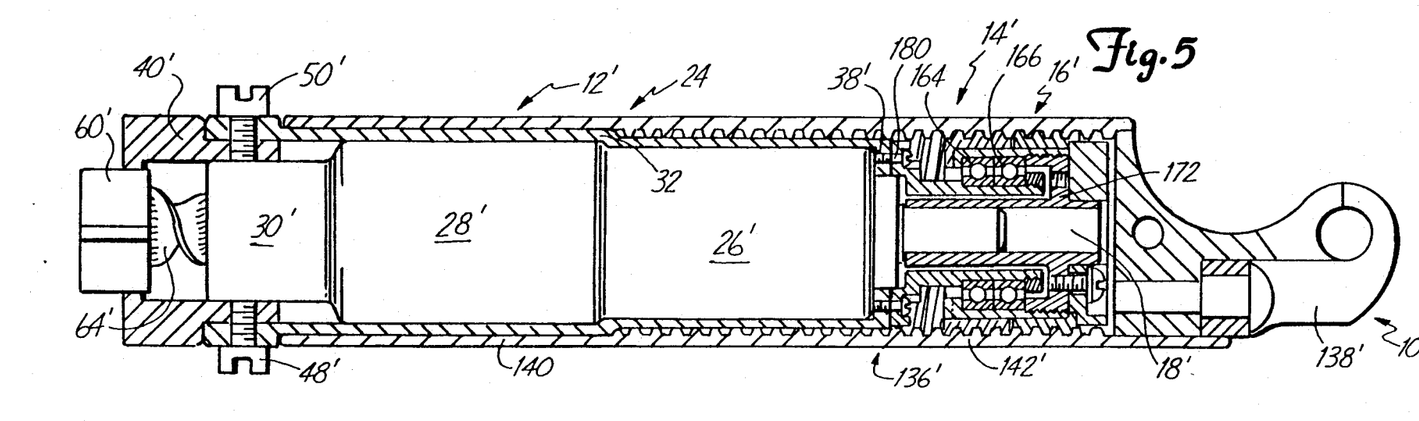
FIG. 5 is a longitudinal section view of an alternative embodiment of the present invention.
Figure 6:
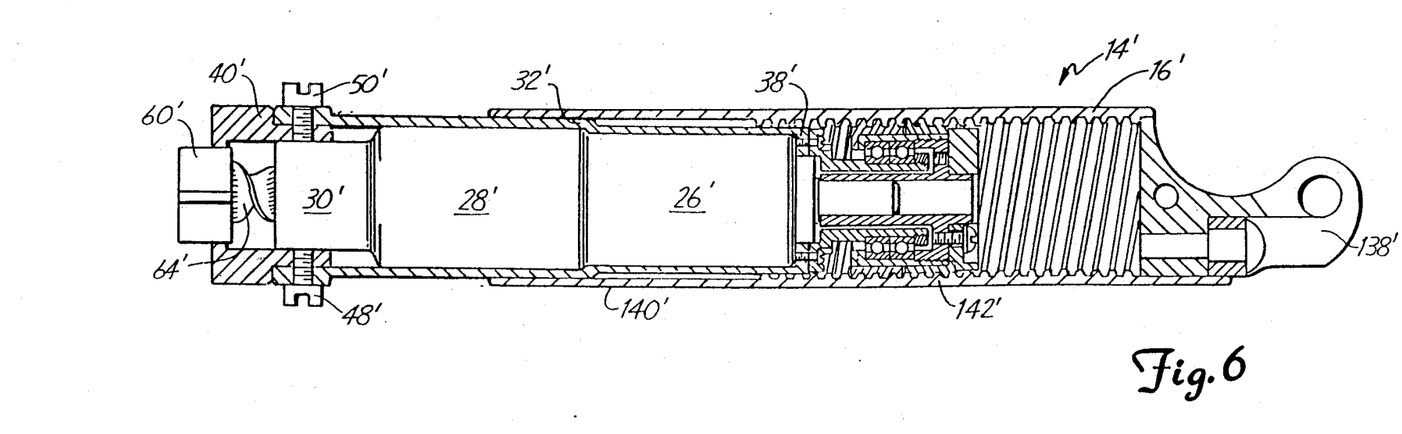
FIG. 6 is a longitudinal section view of the actuator of FIG. 5 shown with the threaded shell partially extended.

The threaded shell 16' includes a hollow tubular portion, 136', a pivot yoke, 138', an outer portion, 142', having an extension thread 22' thereon, and an inner portion, 140', having a smooth cylindrical inner surface.

The preferred material for threaded shell 16 is a high strength steel to avoid dents and to provide good bending resistance. The preferred material for trailing screw 68 and lead screw 70 is a filled plastic material such as Delrin AF which provides a high strength material that can be easily molded and is self lubricating. Because present combinations of miniature electric motors and miniature gearboxes do not allow sufficient rotation rates or speeds for drive shaft 18, the actuation speed is thereby limited. The present invention overcomes this problem by using high pitch or high helix angle threads on both trailing screw 68 and lead screw 70. In addition, multiple start threads are used on both trailing screw 68 and lead screw 70 to increase the amount of thread surface area bearing the load. As seen in FIG. 4, when screw phase 72 is adjusted to offset lead screw 70 from trailing screw 68 so as to remove backlash, only one of the trailing screw 68 or lead screw 70 will be bearing all the load at any one time. Therefore, a trapezoidal profile thread is used in the present invention for strengthening of trailing screw 68 and lead screw 70.

The operation of actuator 10, 10' of the present invention is best understood with reference to FIGS. 5 and 6. The actuation of drive assembly 12, 12' to effect rotation of drive shaft 18, 18' imparts rotation to the hub and thereby to the trailing screw 68, 68' and lead screw 70, 70'. With reference to FIG. 6, it will be seen that operation of actuation device 10, 10' is effective to extend threaded shell 16, 16' longitudinally outwardly from screw phaser 72, 72' by continued rotation of trailing screw 68, 68' and lead screw 70, 70' in this manner, with both threaded shell 16, 16' and drive housing 32, 32' restrained from rotation by attachment of a load tube pivot yoke, 138, 138' and a pivot mount attached to screws 48, 48' and 50, 50'. To provide for the reciprocating return of threaded shell 16, 16' from an extended position to a retracted position, the drive assembly 12, 12' is of a type capable of reversing rotation of drive shaft 18, 18' which in turn reverses the rotation of inner screws 68, 68' and outer screw 70, 70'. Reversal of the direction of rotation of trailing screw 68, 68' and lead screw 70, 70' thereby reverses the longitudinal movement of threaded shell 16, 16' along trailing screw 68, 68' and lead screw 70, 70'.

The present invention is a miniature actuating device that can be made very small and yet withstand large bending forces. In addition, the present invention uses commercially available drive components, such as motors and gearboxes, to achieve a fast actuating device.

Although the present invention has been described with reference to preferred embodiments, workers skilled in the art will recognize that changes may be made in form and detail without departing from the spirit and scope of the invention.

What is claimed is:

1. An actuating device suited for selectively changing positions of bodies relative to one another, the device comprising:
   a drive assembly including:
      a rotary motion transmission means having a first end suited for receiving torque, and a second end suited for imparting rotational motion; and
      a mounting means suited for supporting said rotary motion transmission means;
   an interior truncated forcing means having a first spiral forcing thread forming at least part of an outer surface thereof, said interior truncated forcing means engaged with said second end of said rotary motion transmission means such that said interior truncated forcing means can be rotated unitarily about an axis;
   an exterior extension means having a first spiral extension thread forming at least part of an inner surface thereof, said exterior extension means having an aperture exposing said inner surface through which both said interior truncated forcing means and said drive assembly can be positioned at least in part within said exterior extension means with that portion of said inner surface across from said drive assembly being substantially concentrically disposed thereabout excluding any asymmetry due to said first spiral extension thread, said first spiral forcing thread being in threaded engagement with said first spiral extension thread such that rotation of said interior truncated forcing means results in said first spiral forcing thread being forced toward moving along said first spiral extension thread to thereby force said exterior extension means toward moving relative to said drive assembly with said first spiral extension thread being positionable at least in part about said drive assembly.

2. The actuating device of claim 1 wherein said interior truncated forcing means has a plurality of spiral forcing threads forming at least part of an outer surface thereof.

3. The actuating device of claim 1 wherein said interior truncated forcing means includes a first outer portion of said outer surface having a part of said first spiral forcing thread formed therein, a second outer portion with a second outer surface having another part of said first spiral forcing thread formed therein, and a locking means for fixing a position of said first outer portion relative to said second outer portion.

4. The actuating device of claim 1 wherein said first spiral forcing thread has a trapezoidal thread profile.

5. The actuating device of claim 1 wherein said interior truncated forcing means includes a rotational support mean positioned against said drive assembly but free of any connection to said rotary motion transmission means second end, and an outer sleeve connected to said rotary motion transmission means second end that is capable of rotating about said rotational support means and with said first spiral forcing thread being formed in an outer surface thereon, whereby forces acting on said exterior extension means are transferred to said outer sleeve which in turn transfers said forces to said rotational support means to be in turn transferred to said drive assembly.

6. The actuating device of claim 1 wherein said rotary motion transmission means is a gearbox capable of providing a rotation rate reduction so that a rotation of said second end thereof occurs at a rate less than that of a corresponding rotation of said first end thereof.

7. The actuating device of claim 1 wherein said drive assembly includes an electric motor which engages said rotary motion transmission means first end.

8. The actuating device of claim 1 wherein said drive assembly is enclosed in a housing and wherein said inner surface of said exterior extension means is complementarily shaped so that said inner surface of said exterior extension means can selectively position along and about said drive assembly housing.

9. The actuating device of claim 6 wherein said first spiral forcing thread has a pitch that is sufficiently high to accommodate a plurality of threads.

10. The actuating device of claim 1 wherein said first spiral forcing thread has a pitch that is sufficiently high to compensate movement speed of said exterior extension means for said rotation rate reduction.

* * * * *